United States Patent
Ohno et al.

(10) Patent No.: US 10,534,352 B2
(45) Date of Patent: Jan. 14, 2020

(54) PROCESSING DEVICE, NETWORK DEVICE, CONTROL METHOD OF PROCESSING DEVICE, CONTROL METHOD OF NETWORK DEVICE, AND RECORDING MEDIUM

(71) Applicant: Yokogawa Electric Corporation, Tokyo (JP)

(72) Inventors: Takeshi Ohno, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 190 days.

(21) Appl. No.: 15/713,876

(22) Filed: Sep. 25, 2017

(65) Prior Publication Data

US 2018/0088561 A1    Mar. 29, 2018

(30) Foreign Application Priority Data

Sep. 26, 2016  (JP) ................................ 2016-187491

(51) Int. Cl.
| | | |
|---|---|---|
| *G05B 19/418* | (2006.01) | |
| *G06F 11/07* | (2006.01) | |
| *G06F 11/20* | (2006.01) | |

(52) U.S. Cl.
CPC ... *G05B 19/4185* (2013.01); *G05B 19/41875* (2013.01); *G06F 11/0709* (2013.01); *G06F 11/2033* (2013.01)

(58) Field of Classification Search
CPC ................................................ G05B 19/4185

USPC ......................................................... 700/19
See application file for complete search history.

(56) References Cited

U.S. PATENT DOCUMENTS

| | | | | |
|---|---|---|---|---|
| 5,970,430 A | * | 10/1999 | Burns ................ | G05B 19/0425 |
| | | | | 702/122 |
| 5,980,078 A | | 11/1999 | Krivoshein et al. | |
| 6,088,665 A | * | 7/2000 | Burns ................ | G05B 19/0426 |
| | | | | 702/188 |

(Continued)

FOREIGN PATENT DOCUMENTS

| | | |
|---|---|---|
| JP | 11127179 A | 5/1999 |
| JP | 2000-218476 A | 8/2000 |

(Continued)

*Primary Examiner* — David T Welch
(74) *Attorney, Agent, or Firm* — Sughrue Mion, PLLC

(57) ABSTRACT

A processing device according to one aspect of the present invention includes a provider configured to provide a process to a first device connected to a network of a process control system in a plant, an acquirer configured to acquire a live list generated by the first device based on diagnostic communication packets transmitted from the first device at predetermined time intervals, the live list comprising information indicating whether communication between the first device and another processing device that provides a process to the first device is norma, the processing device and the another processing device constituting a redundant pair 1, and a switch configured to switch a state of the provider from a standby state in which the provider is on standby to provide the process to the first device to an active state in which the provider provides the process to the first device based on the acquired live list.

14 Claims, 11 Drawing Sheets

(56) References Cited

U.S. PATENT DOCUMENTS

| | | | |
|---|---|---|---|
| 6,335,927 B1* | 1/2002 | Elliott | H04L 12/14 370/352 |
| 6,553,408 B1* | 4/2003 | Merrell | G06F 3/0601 709/213 |
| 6,856,591 B1* | 2/2005 | Ma | H04L 41/0631 370/216 |
| 7,590,511 B2* | 9/2009 | Huisenga | G05B 23/0224 702/183 |
| 2002/0083364 A1 | 6/2002 | Christensen et al. | |
| 2004/0230323 A1* | 11/2004 | Glanzer | G05B 9/02 700/18 |
| 2006/0111794 A1* | 5/2006 | Wysuph | G06F 11/1497 700/19 |
| 2006/0184809 A1* | 8/2006 | Kojou | G06F 1/3203 713/300 |
| 2008/0002670 A1* | 1/2008 | Bugenhagen | H04L 12/66 370/352 |
| 2008/0034112 A1* | 2/2008 | Imai | H04L 45/00 709/238 |
| 2008/0109099 A1* | 5/2008 | Moshier | G06Q 10/06 700/103 |
| 2009/0046732 A1* | 2/2009 | Pratt, Jr. | H04L 12/66 370/406 |
| 2010/0115528 A1* | 5/2010 | Piipponen | H04B 1/0003 718/104 |
| 2013/0311617 A1 | 11/2013 | Takahashi et al. | |
| 2014/0153408 A1* | 6/2014 | Jun | H04L 65/1066 370/250 |
| 2015/0141030 A1* | 5/2015 | Basu-Mallick | H04W 76/36 455/452.1 |
| 2017/0039118 A1 | 2/2017 | Shimodoi | |

FOREIGN PATENT DOCUMENTS

| | | |
|---|---|---|
| JP | 2015-092400 A | 5/2015 |
| WO | 2015/098589 A1 | 7/2015 |

* cited by examiner

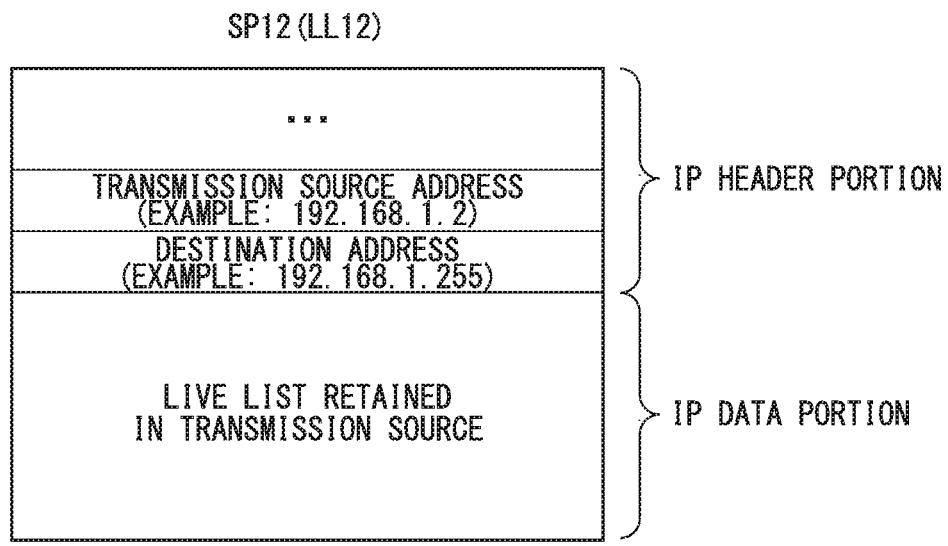

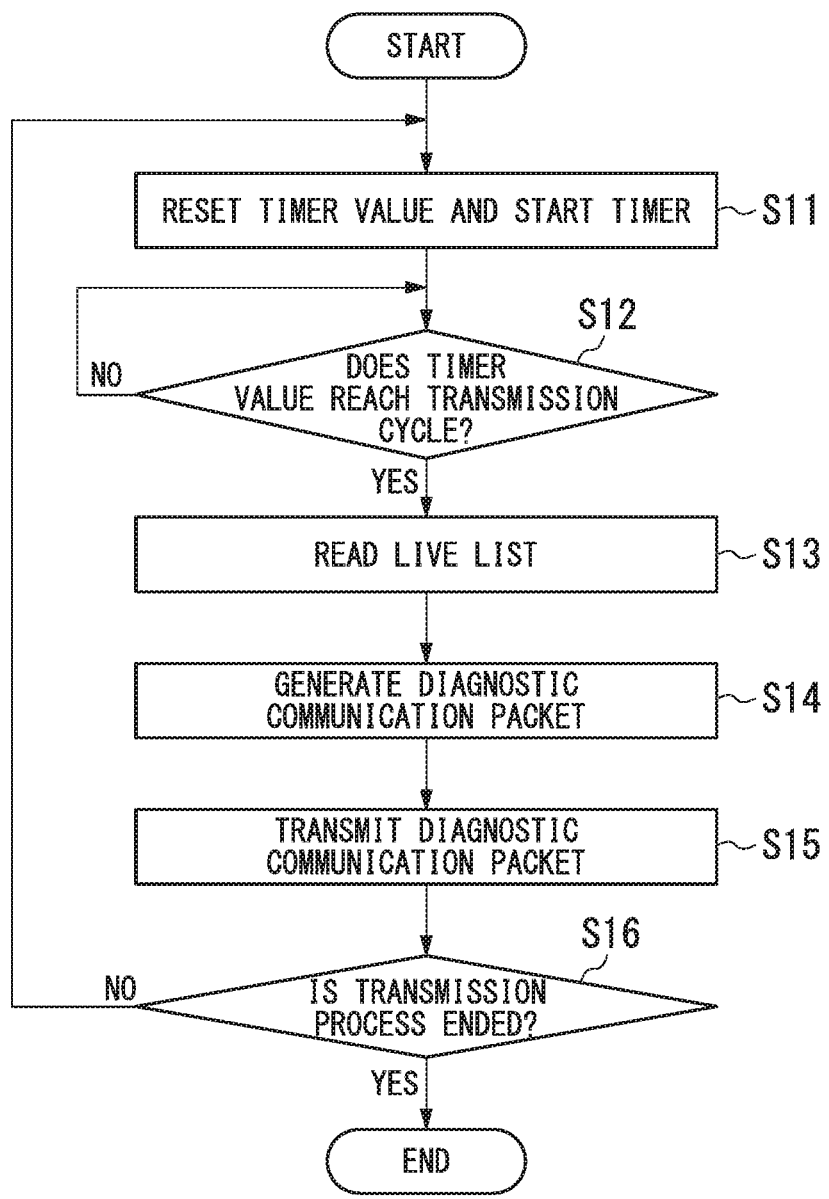

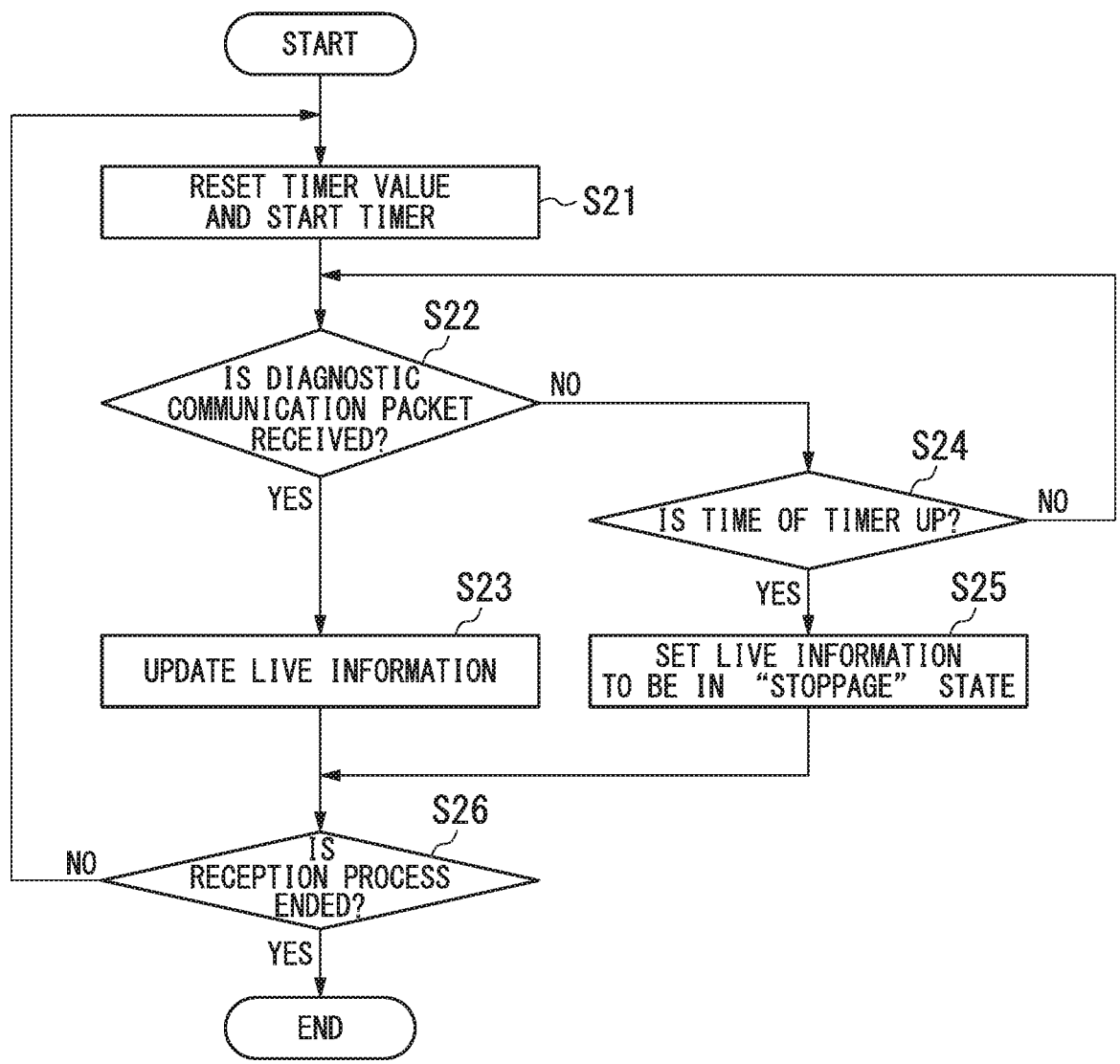

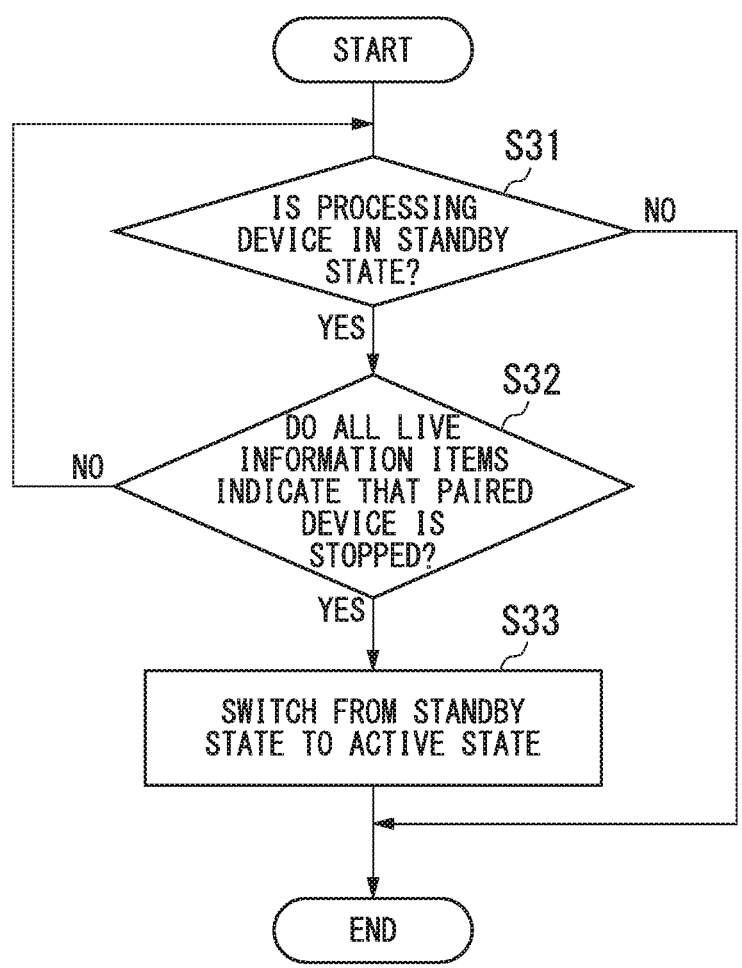

| IP ADDRESS | STATE |
|---|---|
| 192.168.1.1 (PC11) | ○ |
| 192.168.1.2 (PC12) | ○ |
| 192.168.1.3 (PC13) | – |
| 192.168.1.4 (PC14) | ○ |
| 192.168.1.5 | – |
| ⋮ | ⋮ |
| 192.168.1.254 | – |

LIVE LIST UPDATE →

LL13

| IP ADDRESS | STATE |
|---|---|
| 192.168.1.1 (PC11) | ○ |
| 192.168.1.2 (PC12) | ○ |
| 192.168.1.3 (PC13) | – |
| 192.168.1.4 (PC14) | × |
| 192.168.1.5 | – |
| ⋮ | ⋮ |
| 192.168.1.254 | – |

FIG. 8

192.168.1.1 (PC11) SEARCHED RESULT

| IP ADDRESS | STATE |
|---|---|
| 192.168.1.3 (PC13) | ○ |
| 192.168.1.4 (PC14) | ○ |

FIG. 11A

| LL11 | |
|---|---|
| DIAGNOSTIC COMMUNICATION TRANSMITTER | WHETHER OR NOT DIAGNOSTIC COMMUNICATION IS RECEIVED |
| PC11 | - |
| PC12 | - |
| PC13 | ○ |
| PC14 | ○ |

| LL12 | |
|---|---|
| DIAGNOSTIC COMMUNICATION TRANSMITTER | WHETHER OR NOT DIAGNOSTIC COMMUNICATION IS RECEIVED |
| PC11 | - |
| PC12 | - |
| PC13 | ○ |
| PC14 | ○ |

| LL13 | |
|---|---|
| DIAGNOSTIC COMMUNICATION TRANSMITTER | WHETHER OR NOT DIAGNOSTIC COMMUNICATION IS RECEIVED |
| PC11 | × |
| PC12 | ○ |
| PC13 | - |
| PC14 | ○ |

| LL14 | |
|---|---|
| DIAGNOSTIC COMMUNICATION TRANSMITTER | WHETHER OR NOT DIAGNOSTIC COMMUNICATION IS RECEIVED |
| PC11 | ○ |
| PC12 | ○ |
| PC13 | ○ |
| PC14 | - |

⇧ LOGICAL COUPLING

TB11

| TRANSMITTER SIDE \ RECEIVER SIDE | PC11 | PC12 | PC13 | PC14 |
|---|---|---|---|---|
| PC11 | - | - | × | ○ |
| PC12 | - | - | ○ | ○ |
| PC13 | ○ | ○ | - | ○ |
| PC14 | ○ | ○ | ○ | - |

| DIAGNOSTIC COMMUNICATION TRANSMITTER | WHETHER OR NOT DIAGNOSTIC COMMUNICATION IS RECEIVED |
|---|---|
| PC11 | - |
| PC12 | - |
| PC13 | × |
| PC14 | ○ |

LL12

| DIAGNOSTIC COMMUNICATION TRANSMITTER | WHETHER OR NOT DIAGNOSTIC COMMUNICATION IS RECEIVED |
|---|---|
| PC11 | - |
| PC12 | - |
| PC13 | ○ |
| PC14 | ○ |

LL13

LL14

| DIAGNOSTIC COMMUNICATION TRANSMITTER | WHETHER OR NOT DIAGNOSTIC COMMUNICATION IS RECEIVED |
|---|---|
| PC11 | ○ |
| PC12 | ○ |
| PC13 | ○ |
| PC14 | - |

LOGICAL COUPLING

TB11

| TRANSMITTER SIDE \ RECEIVER SIDE | PC11 | PC12 | PC13 | PC14 |
|---|---|---|---|---|
| PC11 | - | - | - | ○ |
| PC12 | - | - | - | ○ |
| PC13 | × | ○ | - | ○ |
| PC14 | ○ | ○ | - | - |

PROCESSING DEVICE, NETWORK DEVICE, CONTROL METHOD OF PROCESSING DEVICE, CONTROL METHOD OF NETWORK DEVICE, AND RECORDING MEDIUM

BACKGROUND OF THE INVENTION

Field of the Invention

The present invention relates to a processing device, a network device, a control method of a processing device, a control method of a network device, and a recording medium.

The present application claims priority based on Japanese patent application 2016-187491, filed on Sep. 26, 2016 and includes herein by reference the content thereof.

Description of Related Art

In the related art, a distributed control system (DCS) in which field devices such as measurement devices or operation devices called field devices and a control device that controls the field devices are connected through communication means is established in a factory or a plant (hereinafter, referred to as a "plant" in a case where the plant and the factory are commonly termed) such as an industrial plant including a chemical plant, a plant that manages and controls a well site such as a gas field or an oil field or the periphery thereof, a plant that manages and controls generation of hydraulic power, thermal power, or nuclear power, a plant that manages and controls environmental power generation such as solar power and wind power, or a plant that manages and controls a water supply and sewage system or a dam. In such a DCS, an advanced automatic operation is realized.

There are some cases where high reliability and real-time properties are required in a plant system established for realizing an advanced automatic operation described above. For example, feedback control in which a processing result is fed back as an input of the processing and the feedback result is used is often used in control of the plant such as process control. In the feedback control, if a loss occurs in processing data, stability of the control is lowered.

Thus, in the control of the plant, there are some cases where a redundant system which has a redundant configuration using a plurality of devices is used in order to improve availability of the system. For example, the redundant system includes a processing device ordinarily used and another processing device used when it is determined that the processing device is abnormal based on a heartbeat signal (to be described below) from the processing device. The abnormally used processing device is in a standby state and does not perform a control process when the ordinarily used processing device is operated. The ordinarily used processing device outputs the heartbeat signal for notifying that a resource of the processing device is normally operated at predetermined time intervals. The abnormally used processing device monitors the heartbeat signal of the ordinarily used processing device, is switched from the standby state to an active state when the abnormality of the heartbeat signal is detected, and performs the control process instead of the abnormal resource of the ordinarily used processing device (for example, see Japanese Unexamined Patent Application, First Publication No. 2000-218476 or PCT International Publication No. WO2015-098589).

In a control network used in the control of the plant, in order to determine that a communication path between devices connected to the control network is normal, each of the devices broadcasts a diagnostic communication packet which is a packet for diagnosing communication in a fixed cycle. The diagnostic communication packet includes identification information of a transmission source. The device that receives the diagnostic communication packet generates or updates a live list acquired listing the devices which are the transmission sources, and retains information items of the devices capable of communicating (for example, see Japanese Unexamined Patent Application, First Publication No. 2015-092400).

In the system of the related art, it is necessary to add a function (hardware or software) of performing a dedicated process such as a generation process or a reception process of the heartbeat signal in order to establish the redundant system, and device cost may be raised.

For example, even though a resource that provides a process is normal, in a case where the added function is abnormal like in a case where wiring through which the heartbeat signal is transmitted and received is disconnected, the abnormally used processing device detects abnormality of the heartbeat signal, and is switched from the standby state to the active state. Thus, a so-called split-brain syndrome (hereinafter, abbreviated as "SB") in which data inconsistency due to duplication of the process occurs may occur, and the process may be unstable.

The live list is acquired by listing the devices of which communication states are normal, and is not for use in the redundant system.

One aspect of the present invention provides a processing device, a network device, a control method of a processing device, a control method of a network device, and a recording medium which are capable of realizing a high-stability redundant configuration with low cost.

SUMMARY

A processing device according to one aspect of the present invention may include a provider configured to provide a process to a first device connected to a network of a process control system in a plant, an acquirer configured to acquire a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair, and a switch configured to switch a state of the provider from a standby state in which the provider is on standby to provide the process to the first device to an active state in which the provider provides the process to the first device based on the acquired live list.

In the above-described processing device, the acquirer may be configured to acquire a plurality of live lists. The switch may be configured to switch the state of the provider from the standby state to the active state when all the plurality of live lists acquired within a predetermined period include the information indicating that the communication between the first device and the another processing device is not normal.

The above-described processing device may further include a receiver configured to receive the diagnostic communication packets, a generator configured to generate the live list based on the received diagnostic communication packets, and a transmitter configured to transmit the generated live list as a part of diagnostic communication packets of the processing device at predetermined time intervals.

In the above-described processing device, the transmitter may be configured to transmit the diagnostic communication packets to all communication destinations that communicate when the process of the processing device is used in the first device.

In the above-described processing device, the generator may be configured to generate the live list based on the diagnostic communication packets of all communication destinations that communicate when the other processing device is used.

A processing device according to another aspect of the present invention may include a provider configured to provide a process to a first device connected to a network of a process control system in a plant, a transmitter configured to transmit diagnostic communication packets at predetermined time intervals, and an acquirer configured to acquire a live list based on diagnostic communication packets generated by the first device and transmitted from the first device at predetermined time intervals, the live list comprising information on operation state of devices of transmission sources of the diagnostic communication packets.

In the above-described processing device, the transmitter may be configured to transmit the diagnostic communication packets to all communication destinations that communicate when the process of the processing device is used in the first device.

The above-described processing device may further include a switch configured to switch a state of the provider to a standby state in which the provider is on standby to provide the process to the first device based on the acquired live list.

In the above-described processing device, the switch may be configured to analyze a communication state of a communication path between the processing device and the first device using the live list acquired within a predetermined period, and switch the state of the provider to the standby state when a communication state between the first device and another processing device that provides a process to the first device has a priority higher than a communication state between the first device and the processing device. The transmitter may be configured to stop the transmitting of the diagnostic communication packets.

The above-described processing device may further include a receiver configured to receive diagnostic communication packets transmitted from another processing device that provides a process to the first device, and a generator configured to generate a live list based on the received diagnostic communication packets. The transmitter may be configured to transmit the generated live list as a part of the diagnostic communication packets of the processing device at predetermined time intervals.

A network device connected to a network of a process control system in a plant according to still another aspect of the present invention may include a receiver configured to receive diagnostic communication packets transmitted from a processing device that provides a process to a first devices connected to the network at predetermined time intervals, a generator configured to generate a live list based on the received diagnostic communication packets, the live list comprising information on operation state of devices of transmission sources of the diagnostic communication packets, and a transmitter configured to transmit the generated live list as a part of diagnostic communication packets of the network device at predetermined time intervals.

A control method of a processing device according to still another aspect of the present invention may include providing a process to a first device connected to a network of a process control system in a plant, acquiring a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair, and switching a provision state of the process from a standby state in which the processing device is on standby to provide the process to the first device to an active state in which the processing device provides the process to the first device based on the acquired live list.

A control method of a processing device according to still another aspect of the present invention may include providing a process to a first device connected to a network of a process control system in a plant, transmitting diagnostic communication packets at predetermined time intervals, and acquiring a live list based on diagnostic communication packets generated by the first device and transmitted from the first device at predetermined time intervals, the live list comprising information on operation state of devices of transmission sources of the diagnostic communication packets.

A control method of a network device connected to a network of a process control system in a plant according to still another aspect of the present invention may include receiving diagnostic communication packets transmitted from a processing device that provides a process to a first device connected to the network at predetermined time intervals, generating a live list based on the received diagnostic communication packets, the live list comprising information on operation state of devices of transmission sources of the diagnostic communication packets, and transmitting the generated live list as a part of diagnostic communication packets of the network device at predetermined time intervals.

A non-transitory computer-readable storage medium storing a control program of a processing device according to still another aspect of the present invention, which when executed by a computer, may cause the computer to execute providing a process to a first device connected to a network of a process control system in a plant, acquiring a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair, and switching a provision state of the process from a standby state in which the processing device is on standby to provide the process to the first device to an active state in which the processing device provides the process to the first device based on the acquired live list.

A non-transitory computer-readable storage medium storing a control program of a processing device according to still another aspect of the present invention, which when executed by a computer, may cause the computer to execute providing a process to a first device connected to a network of a process control system in a plant, transmitting diagnostic communication packets at predetermined time intervals, and acquiring a live list based on diagnostic communication packets generated by the first device and transmitted from the first device at predetermined time intervals, the live list comprising information on operation state of devices of transmission sources of the diagnostic communication packets.

A non-transitory computer-readable storage medium storing a control program of a network device which is connected to a network of a process control system in a plant according to still another aspect of the present invention, which when executed by a computer, may cause the computer to execute receiving diagnostic communication packets transmitted from a processing device that provides a process to a first device connected to the network at predetermined time intervals, generating a live list based on the received diagnostic communication packets, the live list comprising information on operation state of devices of transmission sources of the diagnostic communication packets, and transmitting the generated live list as a part of diagnostic communication packets of the network device at predetermined time intervals.

According to one aspect of the present invention, it is possible to provide a processing device, a network device, a control method of a processing device, a control method of a network device, and a recording medium which are capable of realizing a high-stability redundant configuration with low cost.

BRIEF DESCRIPTION OF THE DRAWINGS

FIG. 2 is a diagram showing an example of a diagnostic communication packet according to the embodiment.

FIG. 3 is a diagram showing an example of a live list according to the embodiment.

FIG. 4 is a flowchart showing an example of a transmission operation of the diagnostic communication packet according to the embodiment.

FIG. 5 is a flowchart showing an example of an updating operation of the live list according to the embodiment.

FIG. 6 is a flowchart showing an example of a switching operation of a processing device according to the embodiment.

FIG. 7 is a diagram showing an example of the updating of the live list according to the embodiment.

FIG. 8 is a diagram showing an example of a searched result of the live list according to the embodiment.

FIGS. 11A and 11B are diagrams showing examples of logical coupling of live lists according to the embodiment.

DETAILED DESCRIPTION OF THE INVENTION

Hereinafter, a processing device, a network device, a control method of the processing device, a control method of the network device, and a recording medium according to an embodiment of the present invention will be described in detail with reference to the drawings.

Figure 1:
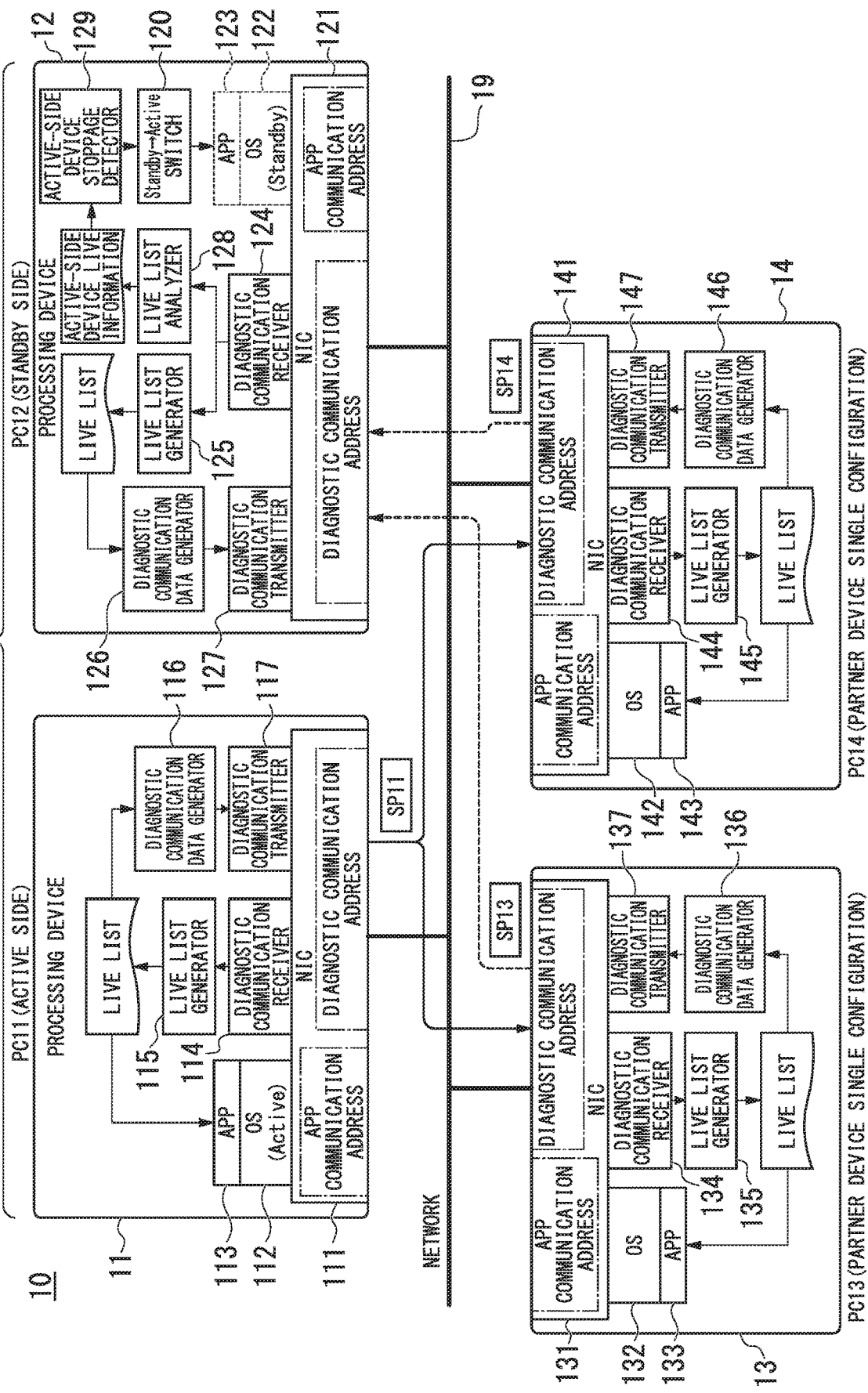
FIG. 1 is a diagram showing a configuration example of a processing system according to an embodiment.

Initially, a configuration of a processing system will be described with reference to FIG. 1. FIG. 1 is a diagram showing a configuration example of a processing system according to the embodiment.

In FIG. 1, a processing system 10 includes a processing device 11, a processing device 12, a terminal device 13, and a terminal device 14. Initially, the outlines of the processing device 11, the processing device 12, the terminal device 13, and the terminal device 14 (hereinafter, may be referred to as "the processing device and the like") will be described. The processing device and the like may be devices constituting a process control system in a plant connected via a network. The processing device and the like may include network devices such as a gateway device (not shown). For example, the processing device and the like are general-purpose computers such as a server device, a desktop PC, a laptop PC, a tablet PC, a PDA, and a smartphone. The processing device and the like may be dedicated devices constituting the process control system in the plant, such as a maintenance information management server that manages maintenance information in the plant, a DCS control device, a factory automation (FA) computer, a programmable logic controller (PLC), an operation-monitoring device, and an operator console. The processing device and the like may be field devices or a maintenance-dedicated device that carries out maintenance of the field devices. For example, the field device may be an input device that inputs a signal of a physical quantity (pressure or temperature) of a differential pressure gauge, a thermometer, or a flowmeter or an output device that outputs a control signal for changing an opening degree of a regulating valve. For example, the maintenance-dedicated device is a device that performs maintenance items such as a loop test, zero point adjustment, and span adjustment on the field device.

It is assumed that the processing device and the like include a central processing unit (CPU), a random-access memory (RAM), a read-only memory (ROM), a hard disk drive (HDD), a display device, and an input device such as a keyboard or a mouse, which are not shown. As for the functions of the processing device 11, the processing device 12, the terminal device 13, and the terminal device 14 which are described below, the function of each device may be realized by causing the CPU to execute a program stored in the RAM. That is, the function of the processing device is a functional module to be realized by software. The program to be executed by the processing device may be provided from a server that provides the program, or may be provided from a recording medium.

The processing device 11 is a device (active-side device) that provides a predetermined process to the terminal device 13 and the terminal device 14 connected via a network 19. The processing device 11 is paired with the processing device 12 (standby-side device), and constitutes a redundant system. For example, the process provided by the processing device 11 is a typical process control process performed by a controller constituting the process control system in the plant, and is a service provided by the processing device monitored using a live list to be described below in the present embodiment. The process provided by the processing device may be a generic server process, and may be a daemon-related service or a virtual IP service. The service provided by the processing device to be monitored is provided by an operation environment (platform) of hardware or a hypervisor (virtualization) that executes an OS 112 and an app (short for application; the same applies later) 113. Accordingly, the processing device may be monitored by monitoring whether or not the operation environment (platform) is operated. The service provided by the processing device to be monitored may be the OS or the app itself. For example, the service may be a process such as data processing, data storing, data transmission, a communication service, or a web service on a web browser which is provided via the network. The service provided by the processing device may be monitored for each process. The device that uses the process provided by the processing device 11 in the present embodiment is referred to as a utilization device. The terminal device 13 and the terminal device 14 are examples of the utilization device.

The processing device 11 broadcasts a diagnostic communication packet (SP11) via the network 19. The diagnostic communication packet is an example of a diagnostic communication packet indicating that the processing device is normally operated. The device which receives the diagnostic communication packet and is connected to the network 19 may diagnose that an operation state of the device (processing device 11) which is a transmission source of the received diagnostic communication packet and a communication state of a communication path between the processing device and the device as the transmission source are normal. For example, the device that receives the diagnostic communication packet may perform a process for selecting the device which is the transmission source of the diagnostic communication packet, as a communication destination. FIG. 1 shows that the diagnostic communication packet (SP11) is transmitted to only the terminal device 13 and the terminal device 14.

It is assumed in the present embodiment that the processing device 12, the terminal device 13, and the terminal device 14 broadcast the diagnostic communication packets (SP12 to SP14) via the network 19. That is, an example in which each of these devices respectively transmits the diagnostic communication packet indicating that each of the devices is normally operated to the device connected to the network 19 is illustrated.

It is assumed that each of the processing device 11, the processing device 12, the terminal device 13, and the terminal device 14 generates a live list based on the received diagnostic communication packet and broadcasts the generated live list as data of the diagnostic communication packet to be transmitted from each of these devices. The generation and transmission of the live list will be described in detail.

The processing device 12 is paired with the processing device 11, and these devices constitute the redundant system (redundant device configuration). The processing device 12 performs the process provided by the processing device 11 instead of the processing device 11 when the processing device 11 becomes abnormal. This process indicates a process to be performed by the OS and the app which only operate on the processing device in an active state. The processing device 12 does not provide the process in a standby state when the processing device 11 is normally operated. The processing device 12 substitutes for the processing device 11 by starting to provide the process after changing from the standby state to the active state when the processing device 11 becomes abnormal. The processing device in the standby state may be referred to as a "standby-side device" or the device in the active state may be referred to as an "active-side device". The processing device 12 broadcasts the diagnostic communication packet (SP12) (not shown) through the network 19.

The terminal device 13 and the terminal device 14 are devices which are connected to the network 19 except for the processing device 11 or the processing device 12 among the network devices constituting the process control system in the plant, and are examples of the communication destinations of the processing device 11 or the processing device 12. The terminal device 13 and the terminal device 14 in FIG. 1 are the utilization devices that use the process provided by the processing device 11 or the processing device 12, and are examples of the processing device of a single configuration that does not constitute the redundant configuration. The terminal device 13 and the terminal device 14 broadcast the diagnostic communication packets (SP13 and SP14) via the network 19 (partially not shown).

Hereinafter, an internal configuration of each of the processing device 11, the processing device 12, the terminal device 13, and the terminal device 14 will be described.

The processing device 11 has functions of a network interface card (NIC) 111, an OS 112, an app 113, a diagnostic communication receiver 114, a live list generator 115, a diagnostic communication data generator 116, and a diagnostic communication transmitter 117.

The NIC 111 is an example of a communication function of performing communication via the network 19. The NIC 111 includes an app communication address which is an example of first identification information and a diagnostic communication address which is an example of second identification information.

The app communication address is identification information for communicating with the app 113 operated on the OS 112, and is an identifier for uniquely determining the app 113 which is a communication partner within the network. The app communication address in a case where these devices constitute the redundant configuration is set to the active-side device in which the app is operated, and is not set to the standby-side device in which the app is not operated. In a case where the active-side device is switched from the PC11 to the PC12, the app communication address is set (transitions) to only the PC 12 which is the active-side device. For example, an Internet Protocol (IP) address or an application-dedicated identifier may be used as the app communication address. For example, the application-dedicated identifier may be a device address of a control bus for process control that enables communication between the devices connected to the network such as Vnet (registered trademark).

The diagnostic communication address of the processing device 11 is an identifier for uniquely determining an individual device connected to the network. Even though the device in the active state is switched in a case where these devices constitute the redundant system, the diagnostic communication address is fixed. An IP address or a MAC address that uses an address closer to a physical layer than the app communication address may be used as the diagnostic communication address. For example, the diagnostic communication address of the processing device 11 is added as information for identifying the transmission source to the diagnostic communication packet, and thus, the terminal device 13 that receives the diagnostic communication packet may determine that packet transmission to the terminal device 13 from the processing device 11 is normal in the transmission and reception of the packet to and from the processing device 11.

In the present embodiment, the app communication address which is an example of the first identification information and the diagnostic communication address which is an example of the second identification information use the same NIC 111. Accordingly, for example, in a case where a load of communication using the app communication address is high, the transmission and reception of the diagnostic communication packet using the diagnostic communication address may fail. For example, a priority in the transmission and reception of the diagnostic communication packet becomes higher than a priority in the app communication using a priority service defined in IEEE 802.1p, and thus, it is possible to reduce a possibility that the communication of the diagnostic communication packet will fail even in a case where a load of the app communication is high.

The first identification information such as an app communication address which is the identifier specific to the app and the second identification information such as an IP address are allocated to the same NIC 111, and thus, the first identification information and the second identification information may have the same degree of availability to the network 19. For example, the first identification information and the second identification information may not be similarly used (operated) for cable detachment or disconnection of a LAN cable connected to the NIC 111 or a communication failure related to the NIC 111 such as a failure of the NIC 111. Accordingly, when the transmission of the diagnostic communication packet using the second identification information cannot be performed due to the communication failure related to the NIC 111, the application communication using the first identification information cannot be performed. Accordingly, when the diagnostic communication packet cannot be detected due to the communication failure, it is possible to prevent the occurrence of SB due to the fact that a plurality of active-side applications to which the same first identification information is allocated can communicate.

As stated above, the first identification information is common to the devices, as the app communication address provided by the processing device 12. The terminal device 13 and the terminal device 14 can use the process provided by the processing device 11 and the process provided by the processing device 12 in the redundant configuration of the processing system 10 without distinguishing these processes using the common first identification information, and thus, it is possible to improve the degrees of availability of the terminal device 13 and the terminal device 14.

The app 113 operated on the OS 112 performs the process of the service provided to the terminal device 13 through the NIC 111. The app 113 can recognize an operation state of the device which is the partner that provides the service based on the live list to be described below. In the present embodiment, the terminal device 13 and the terminal device 14 which are the utilization devices determine whether or not the OS 112 and the app 113 can provide the services depending on whether or not the diagnostic communication packet can be received.

The diagnostic communication receiver 114 receives the diagnostic communication packet transmitted from another device connected to the network 19. In FIG. 1, the diagnostic communication receiver 114 receives the diagnostic communication packets transmitted from the processing device 12, the terminal device 13, and the terminal device 14. Since timings when the diagnostic communication packets are transmitted are determined in the devices on the transmitter side, reception timings of the diagnostic communication packets received by the diagnostic communication receiver 114 from the processing device 12, the terminal device 13, and the terminal device 14 are not synchronized. The diagnostic communication receiver 114 transmits the received diagnostic communication packets to the live list generator 115. The diagnostic communication receiver 114 transmits the diagnostic communication packet to the live list generator 115 whenever the diagnostic communication packet is received. Here, the diagnostic communication receiver 114 may transmit the diagnostic communication packets received within a predetermined time to the live list generator 115 at one time.

The live list generator 115 receives the diagnostic communication packets from the diagnostic communication receiver 114, and generates the live list. The live list is a list (live information) acquired by listing information items of the operation states of the devices which are the transmission sources of the received diagnostic communication packets and information items of communication states of communication paths between the devices which are the transmission sources and the processing device itself. These information items are updated based on whether the diagnostic communication packets are received or not within a predetermined time. When the diagnostic communication packets are received within the predetermined time, the operation states of the devices which are the transmission sources and the communication states of the communication paths are set to "operation/being operated". When the diagnostic communication packets are not received within the predetermined time, the operation states of the devices which are the transmission sources and the communication states of the communication paths are set to "stoppage/being stopped". Since the devices connected to the network 19 respectively transmit the diagnostic communication packets, the transmission and reception of the diagnostic communication packets are mutually performed between two devices. Since the live list generator 115 lists the devices of which the diagnostic communication packets are received, the live list generated in the live list generator 115 is acquired by listing the devices of which communication is normal in the transmission of the diagnostic communication packets from other devices to at least the processing device 11.

The diagnostic communication packets are transmitted so as to cover all used app communication paths. The app communication paths are communication paths used by the apps on the processing device and the utilization device in the network 19, and include communication paths relayed by the network devices such as a gateway device (not shown). In a case where the app communication paths are relayed by the gateway device, the gateway is also the transmission target of the diagnostic communication packet. The live list generator 115 generates the live list based on the diagnostic communication packets of all the communication destinations which communicate in the app communication paths. Accordingly, in a case where the app communication paths are relayed by the gateway device, the gateway device is also included in the generated live list. Accordingly, if any one of the app communication paths is normal, the diagnostic communication packets of the active-side devices are received. In a case where all the diagnostic communication packets of the active-side devices are not received, all the app communication paths are abnormal or the processing device itself fails, and thus, the diagnostic communication packets are not transmitted. The live list is used, and thus, it is possible to prevent the occurrence of the SB even in a case where the processing device in the standby state enters the active state.

The live list generator 115 stores the generated live list such that the live list can be read from the app 113 and the diagnostic communication data generator 116. For example, the live list may be stored in a RAM or an HDD (all not shown). The app 113 and the diagnostic communication data generator 116 may read the stored live list in an arbitrary timing.

The diagnostic communication data generator 116 generates the diagnostic communication packet. The diagnostic communication data generator 116 adds information for identifying the processing device 11 to the diagnostic communication packet. An IP address or a MAC address for diagnostic communication of the processing device 11 may be used as the information for identifying the processing device 11. The diagnostic communication data generator 116 adds the live list generated in the live list generator 115 to an IP data portion of the generated diagnostic communication packet.

The diagnostic communication transmitter 117 transmits the diagnostic communication packets generated in the diagnostic communication data generator 116 so as to cover all the used app communication paths as described above. The diagnostic communication transmitter 117 broadcasts the diagnostic communication packets to the network 19 through the NIC 111 in a predetermined timing. For example, the timing when the diagnostic communication transmitter 117 transmits the diagnostic communication packet is a predetermined time interval (transmission cycle). The diagnostic communication transmitter 117 may instruct the diagnostic communication data generator 116 to generate the diagnostic communication packets when the time reaches the transmission cycle, and may acquire and broadcast the diagnostic communication packets generated in the diagnostic communication data generator 116. Although it has been described in the present embodiment that the diagnostic communication transmitter 117 broadcasts the diagnostic communication packet, in a case where the device that receives the diagnostic communication packet is limited, multicast or unicast may be used instead of the broadcast. The diagnostic communication transmitter 117 may perform broadcast transmission of the diagnostic communication packet to a network of another segment that crosses a router (may transmit the diagnostic communication packet to a directed broadcast address).

The processing device 12 has functions of a NIC 121, an OS 122, an app 123, a diagnostic communication receiver 124, a live list generator 125, a diagnostic communication data generator 126, a diagnostic communication transmitter 127, a live list analyzer 128, a device stoppage detector 129, and a switch 120.

A configuration of the NIC 121 is the same as the configuration of the NIC 111. That is, similarly to the NIC 111, the NIC 121 is an example of a communication function of performing communication via the network 19. The NIC 121 also has the app communication address which is an example of the first identification information and the diagnostic communication address which is the example of the second identification information. The app communication address of the NIC 121 is the same as the app communication address of the NIC 111.

The OS 122 and the app 123 are switched between the standby state and the active state. When the app 123 enters the active state, the process common to the processing device 11 is provided using the app communication address which is the first identification information of the NIC 121. Meanwhile, the process is not provided when the app 123 enters the standby state. Dashed lines of the OS 122 and the app 123 shown in FIG. 1 represent that the OS 122 and the app 123 are in the standby state.

The OS 122 and the app 123 are switched (transitions) from the standby state to the active state based on a request from the switch 120. The OS 122 and the app 123 transition to the active state, and thus, the app 123 continues the process instead of the app 113. The transition from the active state to the standby state may be performed based on a resuming of the processing device 12.

The functions of the diagnostic communication receiver 124, the live list generator 125, the diagnostic communication data generator 126, and the diagnostic communication transmitter 127 are the same as the functions of the diagnostic communication receiver 114, the live list generator 115, the diagnostic communication data generator 116, and the diagnostic communication transmitter 117 in the processing device 11, and thus, the description thereof will be omitted. Here, the diagnostic communication receiver 124 transmits the received diagnostic communication packet to the live list generator 125, and also transmits the received diagnostic communication packet to the live list analyzer 128.

The live list analyzer 128 acquires the live list included in the diagnostic communication packet from the diagnostic communication receiver 124, searches the processing device 11 which is the paired processing device constituting the redundant system from the acquired live list, and updates and records the state of the processing device 11. It is assumed that the state of the processing device 11 is referred to as active-side device live information. The diagnostic communication packets are acquired from the processing device 11, the terminal device 13, and the terminal device 14 in the processing device 12, but it is assumed that the live list analyzer 128 uses the diagnostic communication packets acquired from the terminal device 13 and the terminal device 14 that use the process provided by the processing device 11, as search targets. That is, the live list analyzer 128 acquires and records the state of the processing device 11 when viewed from the utilization device that uses the process provided by the processing device 11. The live list analyzer 128 updates the state of the processing device 11 of the active-side device live information based on the live list included in the diagnostic communication packet acquired from the terminal device 13 and the live list included in the diagnostic communication packet acquired from the terminal device 14.

The live lists acquired by the diagnostic communication receiver 124 are individually acquired from the terminal device 13 and the terminal device 14 in an asynchronous manner. Accordingly, the live list analyzer 128 updates the state of the processing device 11 at a timing when each diagnostic communication packet is acquired. As mentioned above, since the active-side device live information items are individually updated based on the live list of the terminal device 13 and the live list of the terminal device 14, there is no problem about a writing timing in the updating of the state of the processing device 11. In a case where the diagnostic communication packet is not received within a predetermined time, the live list analyzer 128 does not refer to the live list of the terminal of which the diagnostic communication packet is not received. Accordingly, the live list analyzer 128 regards the live list of the terminal of which the diagnostic communication packet is not received within a predetermined time as being in the "stoppage" state, and updates the state of the processing device 11 of the active-side device live information to be in the "stoppage" state. For example, the active-side live device live information is recorded in a RAM (not shown) so as to be read from the device stoppage detector 129.

The device stoppage detector 129 determines that the processing device 11 is being stopped in a case where all the recorded active-side device live information items indicate the "stoppage" state, and instructs the switch 120 to switch the state of the app 123 to be active. In a case where the "stoppage" state of the processing device 11 is recorded in the live list or in a case where the live list is not updated within a predetermined time, the active-side device live information indicates that the state of the processing device 11 of the terminal device (the terminal device 13 or the terminal device 14) is "stopped". The device stoppage detector 129 determines that the processing device 11 is being stopped in a case where both the state of the processing device 11 based on the live list of the terminal device 13 and the state of the processing device 11 based on the live list of the terminal device 14 are "stopped". Meanwhile, the device stoppage detector 129 determines that the processing device 11 is being operated in a case where any one of the state of the processing device 11 based on the live list of the terminal device 13 and the state of the processing device 11 based on the live list of the terminal device 14 is in the "operation" state. In a case where the processing device 11 is actually stopped, since the states of the processing devices 11 of all the live lists enter the "stoppage" state, in a case where any one of the live lists is in the "operation" state, it may be possible to determine that the processing device 11 is being operated. Accordingly, the device stoppage detector 129 can perform determination for distinguishing between a case where the processing device 11 is actually stopped and a case where a failure occurs in a part of packet communication due to the network failure even though the processing device 11 is being actually operated.

The switch 120 performs a process for requesting that the app 123 is to switch from the standby state to the active state according to an instruction from the device stoppage detector 129. A redundant operation is a state in which two devices are prepared such that the standby-side device is switched to the active-side device in a redundant device configuration in which two general-purpose devices are connected via a network. For example, in the case of fault tolerance, if a memory or a disk of the active-side device is changed, a changing location is copied to the standby-side device and is equalized. The terminal device 13 has functions of a NIC 131, an OS 132, an app 133, a diagnostic communication receiver 134, a live list generator 135, a diagnostic communication data generator 136, and a diagnostic communication transmitter 137. The terminal device 14 has functions of a NIC 141, an OS 142, an app 143, a diagnostic communication receiver 144, a live list generator 145, a diagnostic communication data generator 146, and a diagnostic communication transmitter 147.

The functions of the NIC 131, the OS 132, the app 133, the diagnostic communication receiver 134, the live list generator 135, the diagnostic communication data generator 136, and the diagnostic communication transmitter 137 of the terminal device 13 are conformable to the functions of the NIC 111, the OS 112, the app 113, the diagnostic communication receiver 114, the live list generator 115, the diagnostic communication data generator 116, and the diagnostic communication transmitter 117 of the processing device 11.

The app 133 uses any one of the process provided by the app 113 of the processing device 11 and the process provided by the app 123 of the processing device 12. The app 133 can continuously use the process provided by the app 123 operated instead of the app 113 using the app communication address which is the first identification information common between the processing device 11 and the processing device 12 even though the process provided by the app 113 is stopped.

Although it has been described in FIG. 1 that the diagnostic communication packets are respectively broadcast from the devices connected to the network 19, in a case where the gateway device such as a router is connected to the network 19 and communication is limited, the transmission destination of the diagnostic communication packet may be limited by the gateway device.

It has been described in FIG. 1 that the functions of the processing device 11, the processing device 12, the terminal device 13, and the terminal device 14 are realized by software. However, one or more functions of the processing device 11, the processing device 12, the terminal device 13, and the terminal device 14 may be realized by hardware. As for the functions of the processing device 11, the processing device 12, the terminal device 13, and the terminal device 14, one function may be realized by being divided into a plurality of functions. As for the functions of the processing device 11, the processing device 12, the terminal device 13, and the terminal device 14, two or more functions may be realized by being aggregated into one function.

Hereinabove, a description of the configuration of the processing system using FIG. 1 has been described.

Hereinafter, the diagnostic communication packet generated in the diagnostic communication data generator 116 which is described in FIG. 1 will be described with reference to FIG. 2. FIG. 2 is a diagram showing an example of the diagnostic communication packet according to the embodiment.

In FIG. 2, the diagnostic communication packet represents an IP packet including an IP header portion and an IP data portion. The IP header portion of the diagnostic communication packet includes an IP address which is a transmission source of a packet and an IP address which is a destination thereof. FIG. 2 shows a case where the transmission source is the processing device 12 and the destination is the broadcast. An IP address (192.168.1.2) which is the diagnostic communication address of the processing device 12 is illustrated as the transmission source. An IP address (192.168.1.255) for broadcast is illustrated as the destination address. In the present embodiment, it is not necessary to input information related to the transmission source into the IP data portion using the transmission source address of the diagnostic communication packet as the diagnostic communication address, and thus, it is possible to reduce a packet transmission and reception load.

Information of the live list generated in the live list generator 125 is input into the IP data portion of the diagnostic communication packet. The diagnostic communication packet may indicate that communication of a packet transmitted from the transmission source is normal by including the identification information (for example, the IP address of the transmission source) of the transmission source. Accordingly, in a conventional case where the diagnostic communication packet indicates only that the communication of the packet transmitted from the transmission source is normal, data for reducing a packet data amount is not input into the IP data portion of the diagnostic communication packet. In the present embodiment, it is not necessary to add a function of separately transmitting the live list by adding the information of the live list to the IP data portion of the diagnostic communication packet unlike in a case where the live list is separately transmitted to another device connected to the network 19, and thus, it is possible to reduce device cost. It is not necessary to transmit and receive a dedicated packet for transmitting the live list using the diagnostic communication packet, and thus, it is possible to reduce a communication load in the network.

Hereinabove, a description of the diagnostic communication packet using FIG. 2 has been described.

Hereinafter, the live list included in the diagnostic communication packet described in FIG. 2 will be described with reference to FIG. 3. FIG. 3 is a diagram showing an example of the live list according to the embodiment. FIG. 3 shows the live list included in the diagnostic communication packet transmitted from the terminal device 13. In FIG. 3, the live list includes items of an "IP address" and a "state".

The "IP address" is identification information of another device of which the diagnostic communication packet is received. The live list of FIG. 3 includes data items of all addresses of the network of which the IP addresses are 192.168.1.1 to 192.168.1.254. Among them, 192.168.1.1 to 192.168.1.4 are IP addresses allocated to the processing device 11, the processing device 12, the terminal device 13, and the terminal device 14 which are examples of the PC11 to the PC14. 192.168.1.5 to 192.168.1.254 are unused addresses. In FIG. 3, it is possible to fix a data length of the live list by previously preparing data items of all addresses of the network, and thus, it is easy to analyze the device that receives the live list. Even in a case where the number of devices connected to the network is increased or decreased, it is possible to use the live list with no change.

The "state" is an item of the live list indicating that the device specified by the item of the "IP address" is being operated or stopped. A case where the "state" is "o" means that the device is being operated. A case where the "state" is "x" means that the device is being stopped, i.e. that the diagnostic communication packets are not received within the predetermined time. The live list of FIG. 3 shows that the processing device 11 and the processing device 12 are being operated, and the terminal device 14 is being stopped. Since the live list of FIG. 3 is the live list transmitted from the terminal device 13, the live list of the terminal device 13 is expressed by "-" indicating that there is no data. The live list shows that there is no data for the unused addresses. The live list shown in FIG. 3 is included in the IP data portion shown in FIG. 2 and is transmitted as the diagnostic communication packet.

Although the live list is represented as data in a tabular form for the sake of convenience in description in FIG. 3, the live list included in the diagnostic communication packet may be represented in another data form. For example, the live list may be comma-separated values (CSV) data.

Although it has been described in FIG. 3 that the data length of the live list is fixed, the data length of the live list may be varied. For example, the live list includes the live lists of the processing device 11, the processing device 12, the terminal device 13, and the terminal device 14 actually connected to the network and does not include the live lists for the unused addresses, and thus, it is possible to reduce the data amount of the live list.

The live list may be encrypted data. Although it has been described that the live list of FIG. 3 includes only the live list indicating whether the state of the device is being operated or stopped, the live list may include another information. For example, the live list may include information items such as a communication speed, a packet loss, and a success rate of packet communication.

Hereinabove, a description of the live list using FIG. 3 has been described.

Hereinafter, a transmission operation of the diagnostic communication packet will be described with reference to FIG. 4. FIG. 4 is a flowchart showing an example of the transmission operation of the diagnostic communication packet according to the embodiment. Although it has been described that the transmission operation of the diagnostic communication packet described in FIG. 4 is performed by the processing device 11, the same is true of the processing device 12, the terminal device 13, and the terminal device 14.

In FIG. 4, the processing device 11 resets a timer value, and starts a timer (step S11). The timer started in the process of step S11 is a timer for measuring a transmission cycle in the process of next step S12.

After the process of step S11 is performed, the processing device 11 determines whether or not the timer value reaches the transmission cycle (step S12). The transmission cycle is a cycle in which the diagnostic communication packet is broadcast. If the transmission cycle is short, a transmission interval of the diagnostic communication packet is shorter, and thus, a failure capable of being detected by the diagnostic communication packet is discovered fast. Meanwhile, if the transmission cycle is long, the transmission interval of the diagnostic communication packet is long, and thus, it is possible to reduce the communication load in the network due to the diagnostic communication packet. In a case where it is determined that the timer value does not reach the transmission cycle (step S12: NO), the processing device 11 repeats the process of step S12.

Meanwhile, in a case where it is determined that the timer value reaches the transmission cycle (step S12: YES), the processing device 11 reads the live list (step S13). The live list is generated in the live list generator 115 described in FIG. 1, and is stored so as to be read from the diagnostic communication data generator 116. That is, the live list read in the process of step S13 is the latest information updated in the live list generator 115.

After the process of step S13 is performed, the processing device 11 generates the diagnostic communication packet (step S14). As described in FIG. 2, the diagnostic communication packet is executed by inputting the live list read in the process of step S13 into the IP data portion. After the process of step S14 is performed, the processing device 11 performs broadcast transmission of the diagnostic communication packet generated in the process of step S14 (step S15).

After the process of step S15 is performed, the processing device 11 determines whether or not to end (stop) the process for transmitting the diagnostic communication packet (step S16). In a case where it is determined not to end the transmission process of the diagnostic communication packet (step S16: NO), the processing device 11 returns to the process of step S11, and repeats the process of step S11 to step S16. Meanwhile, in a case where it is determined to end the processing for transmitting the diagnostic communication packet (step S16: YES), the processing device 11 ends the transmission operation of the diagnostic communication packet shown in the flowchart of FIG. 4. The processing device 11 continues the transmission process of the diagnostic communication packet for a period during which the process is provided, but ends the transmission process of the diagnostic communication packet in a case where the processing device 12 consciously performs the process instead of the processing device 11. If the transmission process of the diagnostic communication packet is ended, since the processing device 12 determines that the processing device 11 is stopped or is disconnected from the network from the contents of the live lists transmitted from the terminal device 13 and the terminal device 14, the processing device 12 transitions from the standby state to the active state.

Hereinabove, a description of the transmission operation of the diagnostic communication packet using FIG. 4 has been described.

Hereinafter, an updating operation of the live list using FIG. 5 will be described. FIG. 5 is a flowchart showing an example of the updating operation of the live list according to the embodiment. The flowchart shown in FIG. 5 is performed in parallel for the devices that transmit the diagnostic communication packets. For example, since the terminal device 13 receives the diagnostic communication packets transmitted from the processing device 11, the processing device 12, and the terminal device 14, the live list generated in the terminal device 13 includes the live list of the processing device 11, the live list of the processing device 12, and the live list of the terminal device 14. Accordingly, the updating operation of the live list of the processing device 11, the updating operation of the live list of the processing device 12, and the updating operation of the live list of the terminal device 14 in the live list of the terminal device 13 are asynchronously performed in parallel. In the following description, an example of the updating operation of the live list of the processing device 11 in the terminal device 13 will be described. The updating operation and the live list of the processing device 12 and the updating operation of the live list of the terminal device 14 in the terminal device 13 are similarly performed. The updating operations of the live lists of the processing device 11, the processing device 12, and the terminal device 14 are similarly performed.

In FIG. 5, the terminal device 13 resets a timer value, and starts a timer (step S21). The timer started in the process of step S21 is a timer for measuring a reception period of the diagnostic communication packet in the process of step S24.

After the process of step S21 is performed, the terminal device 13 determines whether or not the diagnostic communication packet of the processing device 11 is received (step S22). The broadcast transmission of the diagnostic communication packet of the processing device 11 is performed in the transmission cycle described in FIG. 4. In a case where it is determined that the diagnostic communication packet of the processing device 11 is received (step S22: YES), the terminal device 13 updates the live list of the processing device 11 (step S23). In a case where the live list includes only the information indicating whether the device is being operated or stopped, the information indicating that the device is being operated is maintained.

Meanwhile, in a case where it is determined that the diagnostic communication packet of the processing device 11 is not received (step S22: NO), the terminal device 13 determines whether or not the time of the timer is up (step S24). The value of the timer determined in the process of step S24 may be previously determined based on the transmission cycle of the diagnostic communication packet of the processing device 11. For example, in a case where the transmission cycle of the diagnostic communication packet of the processing device 11 is Thb (seconds), it is assumed that the value of the time-up is Thb×n (n is an integer of 1 or more) (seconds). Since reception check is not performed in the packet communication using the broadcast, there are some cases where the diagnostic communication packet transmitted from the processing device 11 cannot reach the terminal device 13. For example, it is possible to gain three opportunities to receive the diagnostic communication packet by setting the value of the time-up to be Thb×3 (seconds), and it is possible to reduce influence of a temporary packet loss. In a case where it is determined that the time of the timer is not up (step S24: NO), the terminal device 13 returns to the process of step S22, and is on standby to receive the diagnostic communication packet.

Meanwhile, in a case where it is determined that the time of the timer is up (step S24: YES), the terminal device 13 updates the live list of the processing device 11 in the live list to be in the stoppage state (the item of the state of FIG. 3 is set to be "x") (step S25). Even in a case where the live list is updated to be in the stoppage state in the process of step S25, in a case where the diagnostic communication packet is received again in the process of step S22, the live list is updated to be in the operated state. The updated live list is included in the IP data portion of the diagnostic communication packet of the terminal device 13 transmitted by reading the live list described in FIG. 4, and is broadcast from the terminal device 13.

After the process of step S23 or the process of step S25 is performed, the terminal device 13 determines whether or not to end the reception process of the diagnostic communication packet (step S26). In a case where it is determined not to end the reception process of the diagnostic communication packet (step S26: NO), the terminal device 13 returns to the process of step S21, and repeats the process of step S21 to step S26. Meanwhile, in a case where it is determined to end the reception process of the diagnostic communication packet (step S26: YES), the terminal device 13 ends the reception operation of the diagnostic communication packet shown in the flowchart of FIG. 5.

For example, although the device that receives the diagnostic communication packet continues the reception process of the diagnostic communication packet for a period during which the device is being connected to the network, the reception process of the diagnostic communication packet is ended by an operation of an operator in a case where the device is disconnected from the network.

Hereinabove, a description of the updating operation of the live list using FIG. 5 has been described.

Hereinafter, a switching operation of the processing device 12 will be described with reference to FIG. 6. FIG. 6 is a flowchart showing an example of the switching operation of the processing device 12 according to the embodiment.

In FIG. 6, it is determined whether or not the processing device 12 is in the standby state (step S31). For example, whether or not the processing device is in the standby state may be determined by the state of the app 123 retained in the switch 120. In a case where it is determined that the processing device is not in the standby state (the processing device is in the active state) (step S31: NO), the processing device 12 ends the process of the switching operation shown in the flowchart of FIG. 6.

Meanwhile, in a case where it is determined that the processing device is in the standby state (step S31: YES), the processing device 12 determines whether the live list of the paired processing device 11 constituting the redundant configuration indicates that the device is being stopped in the live lists included in all the acquired diagnostic communication packets (step S32). Specifically, since the processing device 12 receives the diagnostic communication packets including the live lists from the processing device 11, the terminal device 13, and the terminal device 14, the processing device 12 searches for the live lists transmitted from the processing device 11, the terminal device 13, and the terminal device 14, and confirms the live list of the processing device 11.

In a case where it is determined that the live list of the processing device 11 indicates that the processing device 11 is being stopped in all the acquired live lists (step S32: YES), the processing device 12 is switched from the standby state to the active state (step S33). Specifically, the switch 20 of the processing device 12 is switched from the standby state to the active state, and thus, the app 123 is set to be in the operation state. Thus, the app 123 starts to perform the process of the app 113 instead of the app 113. The processing device 12 that enters the active state once determines that the processing device is not constantly in the standby state in step S31. For example, the transition of the processing device 12 that enters the active state to the standby state again is performed in the restarting (reset process) of the device.

Meanwhile, in a case where it is determined that the live list of the processing device 11 indicates that the processing device 11 is not being stopped in all the acquired live lists (step S32: NO), the processing device 12 returns to the process of step S31, and repeats the process of step S31 to step S32.

Hereinabove, a description of the switching operation of the processing device 12 using FIG. 6 has been described.

Hereinafter, the updating of the live list of the terminal device 13 in the process of step S25 of FIG. 5 will be described with reference to FIG. 7. FIG. 7 is a diagram showing an example of the updating of the live list according to the embodiment.

In FIG. 7, the live list of the terminal device 14 is updated for a period during which the device is being operated or stopped. That is, the live list of the terminal device 13 is updated in a state in which only the live list of the terminal device 14 is updated. The updating of the live list is performed for the live lists of the devices, and thus, it is possible to reduce an updating load of the live list.

For example, the live list shown in FIG. 7 may be displayed on a display device (not shown) of the terminal device 13, or may be printed from a printing device.

Hereinabove, a description of the updating of the live list of the terminal device 13 using FIG. 7 has been described.

Hereinafter, a searched result of the live list performed by the live list analyzer 128 of the processing device 12 will be described with reference to FIG. 8. FIG. 8 is a diagram showing an example of the searched result of the live list according to the embodiment.

In FIG. 8, the live list analyzer 128 searches for the live list of the paired processing device 11 constituting the redundant configuration from the live list of the terminal device 13 and the live list of the terminal device 14, and lists the searched results. (192.168.1.3) of the item of the illustrated IP address indicates that the live list is acquired from the live list of the terminal device 13, and the live list indicates that the device is being operated as represented in the item of the state. (192.168.1.4) of the item of the IP address indicates that live list is acquired from the live list of the terminal device 14, and the live list indicates that the device is being operated as represented in the item of the state. The searched results shown in FIG. 8 are listed, and thus, it is easy to determine whether or not the live list of the processing device 11 serving as the paired device indicates that the processing device is being stopped in the live lists included in all the acquired diagnostic communication packets in the process of step S32 of FIG. 6. For example, the searched results may be displayed on a display device (not shown) of the processing device 12, or may be printed from a printing device.

Hereinabove, a description of the searched result of the live list using FIG. 8 has been described.

Figure 9:
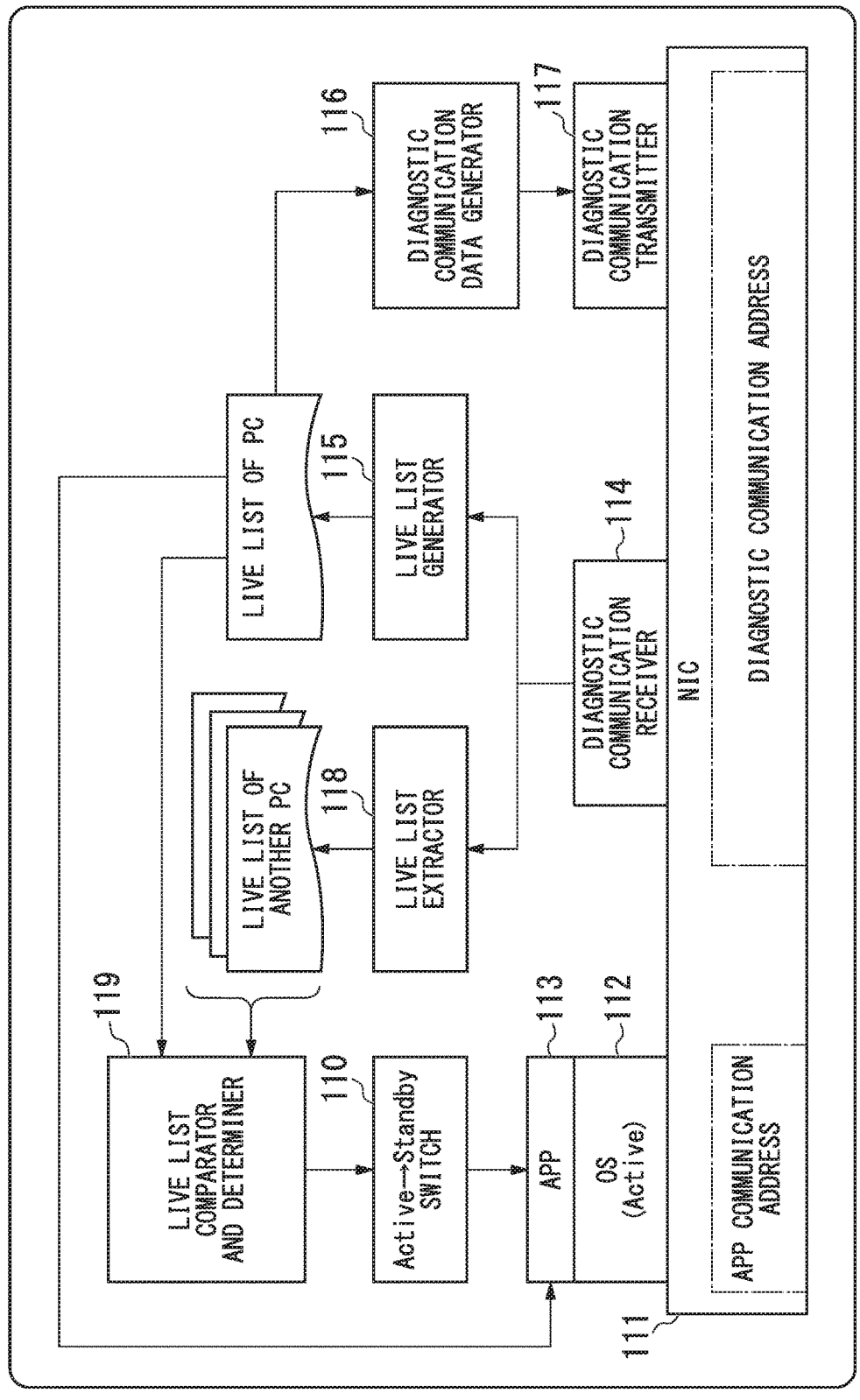
FIG. 9 is a diagram showing a second configuration example of the processing device according to the embodiment.

Hereinafter, a second configuration example of the processing device will be described with reference to FIG. 9. FIG. 9 is a diagram showing the second configuration example of the processing device according to the embodiment.

In FIG. 9, a processing device 11*a* has functions of the NIC 111, the OS 112, the app 113, the diagnostic communication receiver 114, the live list generator 115, the diagnostic communication data generator 116, the diagnostic communication transmitter 117, a live list extractor 118, a live list comparator and determiner 119, and a switch 110. The functions of the NIC 111, the OS 112, the app 113, the diagnostic communication receiver 114, the live list generator 115, the diagnostic communication data generator 116, and the diagnostic communication transmitter 117 in the processing device 11*a* are the same as the functions of those in the processing device 11, and thus, the description thereof will be omitted.

The live list extractor 118 acquires the live list included in the diagnostic communication packet received by the diagnostic communication receiver 114, and extracts a communication state of an app communication path from the acquired live list. The communication path between the app and the utilization device may be divided into a communication path related to transmission from the app to the utilization device and a communication path related to transmission from the utilization device to the app. The live list extractor 118 extracts the communication states of the app communication paths in transmission directions from the received diagnostic communication packets.

The live list comparator and determiner 119 has a live list comparison function and a live list determination function. The live list comparison function logically couples the communication states of the extracted app communication paths. The logical coupling means that information items of the reception states of the diagnostic communication packets of the devices are represented as one table for the transmission devices which are common items in order to compare the communication states of the app communication paths of the devices, and the details will be described with reference to FIGS. 11A and 11B. As for the logically coupled communication states of the app communication paths, it is easy to compare the state of the app communication path in a case where the terminal device 13 and the terminal device 14 which are the utilization devices use the app 113 provided by the processing device 11*a* and the state of the app communication path in a case where the terminal device 13 and the terminal device 14 use the app 123 provided by the processing device 12. For example, the comparison of the states of the communication paths may be performed by performing the comparison using the number of app communication paths capable of communicating in a case where the apps are used. The app of which the number of app communication paths capable of communicating is large has a high degree of availability to the utilization device. Information items of the communication states of the app communication paths coupled with the live list comparison function of the live list comparator and determiner 119 are generated from information items of the reception states of the diagnostic communication packets output from the live list extractor 118, and the communication states thereof are compared.

The live list determination function of the live list comparator and determiner 119 determines the processing state set to be in the active state and the processing device set to be in the standby state among the processing devices constituting the redundant pair. Specifically, the live list comparator and determiner 119 determines whether any one of the processing device 11*a* and the processing device 12 constituting the redundant pair is set to be in the active state or the standby state based on the coupled information items of the communication paths acquired from the live list extractor 118. For example, the live list determination function compares the number (normal number) of app communication paths of in the processing device 11*a* and the processing device 12 which are capable of normally communicating with the terminal device 13 and the terminal device 14 which are the communication partners of the app 113 and the app 123, and determines to set the device having a larger normal number to be in the active state and the other device to be in the standby state. The live list comparator and determiner 119 outputs the determination result to the switch 110.

The switch 110 maintains the operation state of the processing device 11a or switches the processing device 11a to the stoppage state based on the determination of the live list comparator and determiner 119 whether the app 113 continues the operation. The processing device 11a which is the second configuration example of the processing device is different from the processing device 11 in that the processing device 11a can be spontaneously stopped except that the processing device 11 is stopped due to the failure but other than that the processing device 11 is continuously operated in principle. The processing device 11a is spontaneously stopped, and thus, it is possible to improve the availability of the utilization device. When the switching of apps is required, as described in the step 16, the transmission of the diagnostic communication packets may be stopped after stopping the app 113 instead of stopping the processing device 11a.

Although it has been described in the present embodiment that the live list comparator and determiner 119 is spontaneously stopped with the simple comparison of the normal number of app communication paths as a determination criterion, the determination criterion is not limited to this example. For example, the live list comparator and determiner 119 may use a communication speed in the communication between the app and the utilization device, a network distance between the app and the utilization device, an operation time of the processing device, energy efficiency, failure result, or another cause, as the determination criterion.

Hereinabove, a description of the second configuration example of the processing device using FIG. 9 has been described.

Figure 10:
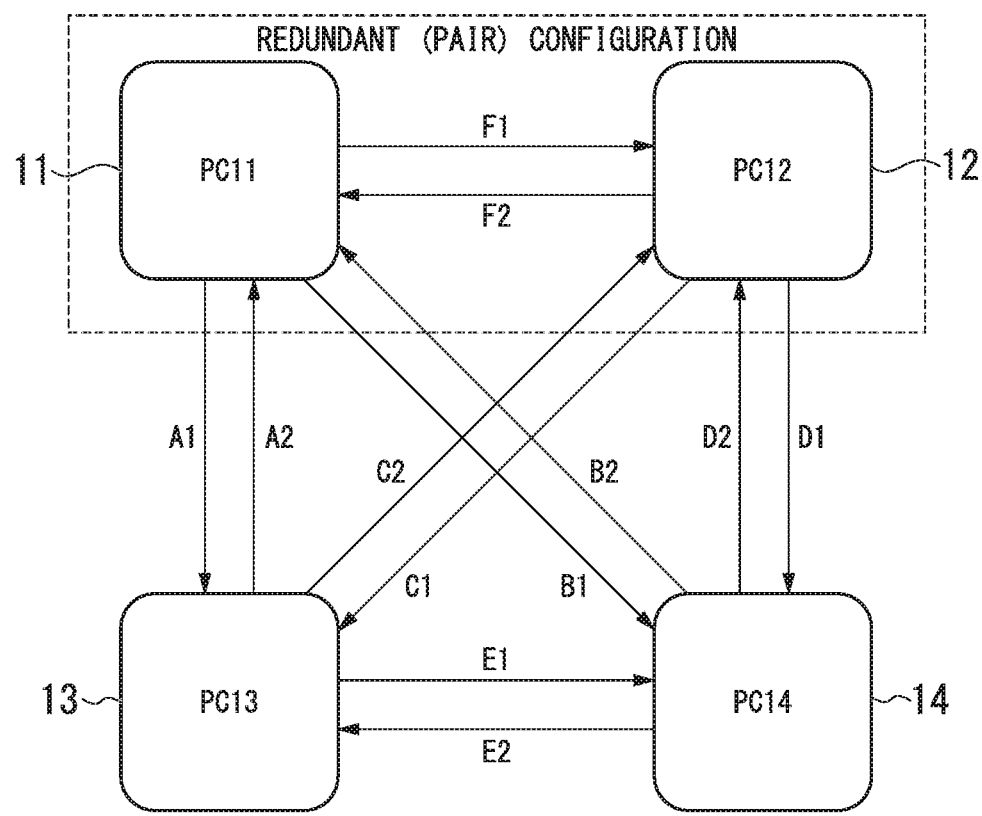
FIG. 10 is a diagram showing an example of an app communication path of a processing system according to the embodiment.

Hereinafter, the app communication path will be described with reference to FIG. 10. FIG. 10 is a diagram showing an example of the app communication path of the processing system according to the embodiment.

In FIG. 10, the processing device 11, the processing device 12, the terminal device 13, and the terminal device 14 transmit and receive the diagnostic communication packets in the communication paths, respectively. For example, a communication path A is used in the packet transmission between the processing device 11 and the terminal device 13. Similarly, it is assumed that the communication path between the processing device 11 and the terminal device 14 is referred to as B, the communication path between the processing device 12 and the terminal device 13 is referred to as C, the communication path between the processing device 12 and the terminal device 14 is referred to as D, the communication path between the terminal device 13 and the terminal device 14 is referred to as E, and the communication path between the processing device 11 and the processing device 12 is referred to as F. Numerals 1 and 2 are assigned to the transmission directions of the communication paths A to F. For example, A1 indicates a direction from the processing device 11 to the terminal device 13, and A2 is a reversed direction thereof.

The app communication paths are communication paths used by the terminal device 13 and the terminal device 14, and are the communication paths A to E among the communication paths A to F shown in FIG. 10. The live list extractor 118 extracts the live lists in both directions of the app communication path. That is, the live list extractor 118 counts the normal number of communication paths A to E in both directions. Meanwhile, since the communication path F is not used in the app communication of the terminal device 13 and the terminal device 14, the live list extractor 118 does not extract the state of the communication path.

Hereinabove, a description of the app communication path using FIG. 10 has been described.

Hereinafter, the logical coupling of the live lists will be described with reference to FIGS. 11A and 11B. FIGS. 11A and 11B are diagrams showing examples of the logical coupling of the live lists according to the embodiment.

FIG. 11A shows the logical coupling of the live lists in a case where the communication path A1 of FIG. 10 fails. FIGS. 11A and 11B show the live list (LL11) of the processing device 11, the live list (LL12) of the processing device 12, the live list (LL13) of the terminal device 13, and the live list (LL14) of the terminal device 14 transmitted through the broadcast. In FIG. 11A, since the live list (LL13) of the terminal device 13 shows that the diagnostic communication packet from the processing device 11 fails, the item of "whether or not diagnostic communication is received" is "x" in "PC11" of the item of "diagnostic communication transmitter". The indication "-" means a path which is not established as the app communication path.

A table acquired by logically coupling the live lists LL11 to LL14 is a logical coupling table TB11 on a right side of an arrow. The logical coupling table TB11 summarizes the item of "diagnostic communication transmitter" of the live list as a "transmitter side" and a generator of the live lists as "receiver side". In the logical coupling table TB11, the state corresponding to the "PC11" on the "transmitter side" and the "PC13" on the "receiver side" is "x".

Here, the normal number of communication paths between the terminal device 13 and the processing device 11 (PC11) (both directions) is 3. Meanwhile, the normal number of communication paths between the terminal device 13 and the processing device 12 (PC12) (both directions) is 4. Accordingly, since the normal number of communication paths in a case where the processing device 12 provides the service using the app 123 is greater than that in a case where the processing device 11 provides the service using the app 113, the live list comparator and determiner 119 of FIG. 9 sets the app 113 to be in the stoppage state. The app 113 is set to be in the stoppage state, and thus, the app 123 becomes active due to the redundant operation.

FIG. 11B shows the logical coupling of the live lists in a case where the communication path A2 of FIG. 10 fails. In FIG. 11B, since the live list (LL11) of the processing device 11 shows that the diagnostic communication packet from the terminal device 13 fails, the item of "whether or not diagnostic communication is received" is "x" in the "PC13" of the item of the "diagnostic communication transmitter". Since the live list (LL13) of the terminal device 13 cannot be transmitted to the processing device 11, the content of the live list (LL13) is not apparent.

Here, a table acquired by logically coupling the live lists LL11 to L114 is a logical coupling table TB11. In the logical coupling table TB11, the state corresponding to the "PC13" on the "transmitter side" and the "PC11" on the "receiver side" is "x".

Here, the normal number of communication paths between the terminal device 13 and the processing device 11 (PC11) (both directions) is 2. Meanwhile, the normal number of communication paths between the terminal device 13 and the processing device 12 (PC12) (both directions) is 3. Accordingly, since the normal number of communication paths in a case where the processing device 12 provides the service using the app 123 is greater than that in a case where the processing device 11 provides the service using the app 113, the live list comparator and determiner 119 of FIG. 9 sets the processing device 11 to be in the stoppage state. The processing device 11 is set to be in the stoppage state, and thus, any devices do not receive the diagnostic communication packets from the processing device 11. Therefore, the state of the processing device 12 is switched from the standby state to the active state, and the app 123 is operated.

Since FIGS. 11A and 11B show the case where the communication path A related to the processing device 11 fails, even in a case where the logical coupling table TB11 is not used, it is easy to determine whether or not to set the processing device 11 to be in the stoppage state. However, for example, it is not easy to determine the redundant operation in a case where a part of both the communication path related to the processing device 11 and the communication path related to the processing device 12 fails. A predetermined condition is applied using the logical coupling table TB11, and thus, it is possible to easily automate the determination of the redundant operation.

Hereinabove, a description of the logical coupling of the live lists using FIGS. 11A and 11B has been described.

Figure 12:
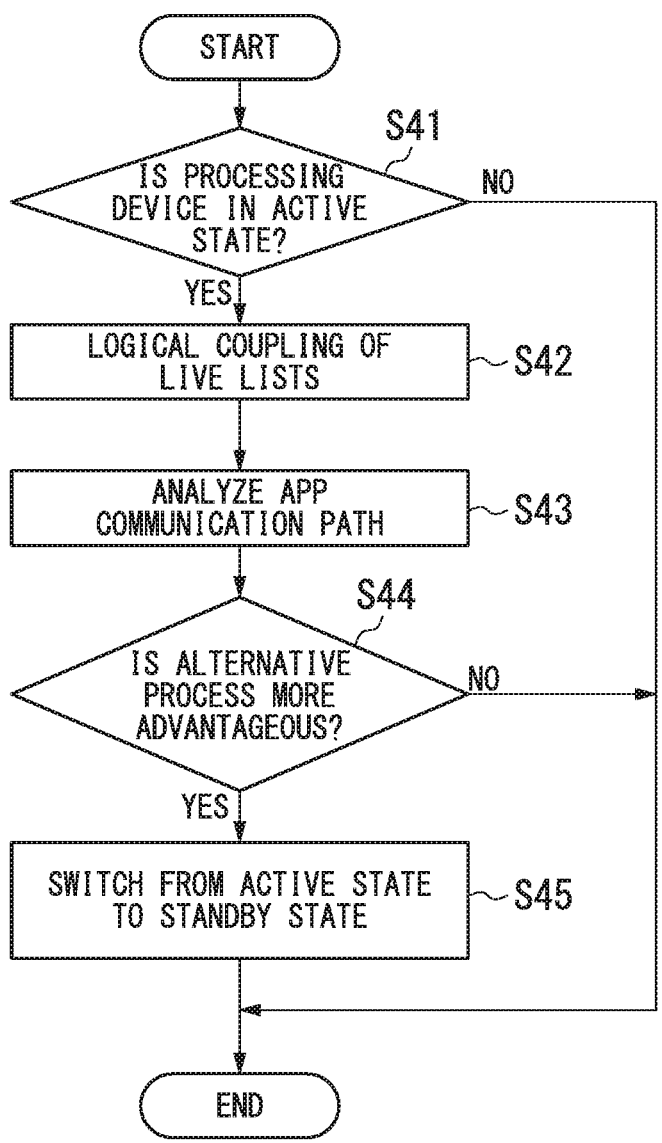
FIG. 12 is a flowchart showing an example of the switching operation of the processing device according to the embodiment.

Hereinafter, a switching operation of the processing device 11a will be described with reference to FIG. 12. FIG. 12 is a flowchart showing an example of the switching operation of the processing device according to the embodiment.

In FIG. 12, it is determined whether or not the processing device 11a is in the active state (step S41). For example, whether or not the processing device is in the active state may be determined by the state of the app 113 retained in the switch 110. In a case where it is determined that the processing device is not in the active state (in a case where the processing device is in the standby state) (step S41: NO), the processing device 11a ends the process of the switching operation shown in the flowchart of FIG. 12.

Meanwhile, in a case where it is determined that the processing device is in the active state (step S41: YES), the processing device 11a logically couples the acquired live lists (step S42). The live lists coupled in step S42 are the live lists (LL11 to LL14) as described in FIGS. 11A and 11B.

After the process of step S42 is performed, the processing device 11a analyzes the app communication paths (step S43). The analysis of the app communication paths is the comparison of the normal number of app communication paths described in FIGS. 11A and 11B. Here, the analysis method of the app communication paths is not limited to the comparison of the normal number of app communication paths. For example, the communication speed of the app communication path, the network distance between the app and the utilization device, the operation time of the processing device, the energy efficiency, the failure result, or another cause may be used as the determination criterion.

After the process of step S43 is performed, the processing device 11a determines whether or not the case where the process is provided by the processing device 12 instead of the processing device 11a is more advantageous than that in the case where the process is provided by the processing device 11a, based on the analysis result (step S44). The determination in the process of step S43 is based on the content of the analysis in the process of step S43 such as comparison of the normal number of app communication paths.

In a case where it is determined that the case where the process is provided by the processing device 12 is more advantageous than that in the case where the processing is provided by the processing device 11a (step S44: YES), the state of the processing device 11a is switched from the active state to the standby state (step S45). In the method of switching the state of the processing device 11a from the active state to the standby state, the switch 110 described in FIG. 9 stops the processing device 11, and thus, the processing device 12 can be in the active state.

Meanwhile, in a case where it is determined that the case where the process is provided by the processing device 12 is not more advantageous than that in the case where the process is provided by the processing device 11a (step S44: NO), the processing device 11a ends the process of the switching operation shown in the flowchart of FIG. 12. That is, the operation state of the processing device 11 is maintained.

For example, the transition of the processing device 11a that enters the standby state once to the active state again is performed in the restarting (reset process) of the device.

Hereinabove, a description of the switching operation of the processing device 11a using FIG. 12 has been described.

Although in the above-described processing system the operations of the processing device and the terminal devices are described based on the functions thereof, these functions may be operated in the same device. These functions may be distributed and performed in the same processing system.

As described above, a processing device according to an embodiment includes a provider that provides a process to a utilization device connected to a network of a process control system in a plant, a acquirer that acquires live lists generated in other devices connected to the network based on diagnostic communication packets transmitted from another processing device that provides a process to the utilization device at predetermined time intervals, and a switch that switches a state of the provider from a standby state in which the provider is on standby to provide the process to the utilization device to an active state in which the provider provides the process based on the acquired live lists. Accordingly, it is possible to realize a high-stability redundant configuration with low cost.

A control method of a processing device of an embodiment includes a process provision step of providing a process to a utilization device connected to a network of a process control system in a plant, a live list acquisition step of acquiring live lists generated in other devices connected to the network based on diagnostic communication packets transmitted from another processing device that provides a process to the utilization device at predetermined time intervals, and a switching step of switching a provision state of the process from a standby state in which the processing device is on standby to provide the process to the utilization device to an active state in which the processing device provides the process based on the acquired live lists. Accordingly, it is possible to realize a high-stability redundant configuration with low cost.

The steps in the process according to the present embodiment are not limited to the above-described order and may be performed in an arbitrary order.

The present embodiment may be performed in the following aspects.

For example, the present embodiment may use a network communication function of the process control system. The present embodiment may be used in a system in which control processing devices or a control processing device and an operation-monitoring device are connected via the network in the process control system.

The present embodiment may be adopted in a system in which the app communication address and the diagnostic communication address are automatically allocated and managed. For example, the present embodiment may be adopted in a system such as a FOUNDATION Fieldbus protocol (High speed Ethernet (HSE)) or a Vnet/IP (registered trademark) protocol. In the case of the Vnet/IP protocol, a Vnet address is used as the app communication address, and an IP address is used as the diagnostic communication address.

A program for realizing the functions of the devices described in the present embodiment may be recorded in a computer-readable recording medium, and various processes of the present embodiment may be performed by reading the program recorded in the recording medium into a computer system and executing the read program. The "computer system" mentioned herein may include an OS or hardware such as a peripheral device. It is assumed that the "computer system" includes a homepage provision environment (or a display environment) as long as a WWW system is used. The "computer-readable recording medium" refers to a writable nonvolatile memory such as a flexible disk, a magneto-optical disk, a ROM, or a flash memory, a portable medium such as a CD-ROM, or a storage device such as a hard disk built in the computer system.

It is assumed that the "computer-readable recording medium" includes a medium that retains the program for a predetermined time, such as a volatile memory (for example, a dynamic random-access memory (DRAM) within a computer system which is a server or a client in a case where the program is transmitted via a communication line such as a telephone line or a network such as the Internet. The program may be transmitted to another computer system using a transmission medium or a transmission wave of the transmission medium from the computer system that stores the program in the storage device. Here, the "transmission medium" that transmits the program refers to a medium having a function of transmitting information such as a communication line such as a telephone line or a network such as the Internet. The program may be used for realizing a part of the above-described functions. The program may be a so-called difference file (difference program) realized by combining the above-described functions with the program already recorded in the computer system.

While the embodiment of the present invention has been described with reference to the drawings, the specific configuration is not limited to the embodiment, and the embodiment includes various changes without departing from the gist of the present invention.

What is claimed is:

1. A processing device, comprising:
at least one memory storing instructions, and
at least one processor configured to execute the instructions to:
provide a process to a first device connected to a network of a process control system in a plant;
acquire a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair; and
switch a provision state of the process from a standby state in which the processing device is on standby to provide the process to the first device to an active state in which the processing device provides the process to the first device based on the acquired live list,
wherein the at least one processor is configured to execute the instructions to:
acquire a plurality of live lists from a plurality of devices connected to the network; and
switch the provision state of the process from the standby state to the active state when all the plurality of live lists acquired within a predetermined period include the information indicating that the communication between the first device and the another processing device is not normally operated,
wherein the at least one processor is configured to execute the instructions to:
provide a process to a second device connected to the network;
receive:
a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and
a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;
acquire the first live list from the first diagnostic communication packet and the second live list from the second diagnostic communication packet; and
switch the provision state of the process from the standby state to the active state when both of the first and second live lists acquired within a predetermined period include information indicating that the communication with the another processing device is not normally operated.

2. The processing device according to claim 1,
wherein the at least one processor is configured to execute the instructions to:
receive the diagnostic communication packets;
generate the live list based on the received diagnostic communication packets; and
transmit the generated live list as a part of diagnostic communication packets of the processing device at predetermined time intervals.

3. The processing device according to claim 2,
wherein the at least one processor is configured to execute the instructions to:
transmit the diagnostic communication packets to all communication destinations that communicate when the process of the processing device is used in the first device.

4. The processing device according to claim 2,
wherein the at least one processor is configured to execute the instructions to:
generate the live list based on the diagnostic communication packets of all communication destinations that communicate when the other processing device is used.

5. A processing device, comprising:
at least one memory storing instructions, and
at least one processor configured to execute the instructions to:
provide a process to a first device connected to a network of a process control system in a plant;
transmit diagnostic communication packets at predetermined time intervals;
acquire a live list based on diagnostic communication packets generated by the first device and transmitted from the first device at predetermined time intervals, the live list comprising information on operation state of devices of transmission sources of the diagnostic communication packets; and
switch a provision state of the process to a standby state in which the processing device is on standby to provide the process to the first device based on the acquired live list,
wherein the at least one processor is configured to execute the instructions to:
acquire a plurality of live lists from a plurality of devices connected to the network;
analyze a communication state of a communication path between the processing device and the first device using the live lists acquired within a predetermined period; and
switch the provision state of the process to the standby state and stop the transmitting of the diagnostic communication packets when a communication state between the first device and another processing device that provides a process to the first device has a priority higher than a communication state between the first device and the processing device, the processing device and the another processing device constituting a redundant pair,
wherein the at least one processor is configured to execute the instructions to:
provide a process to a second device connected to the network;
receive:
a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and
a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;
acquire the first live list from the first diagnostic communication packet and the second live list from the second diagnostic communication packet;
analyze the communication state of the communication path between the processing device and the first device using the first and second live lists acquired within the predetermined period; and
switch the provision state of the process to the standby state when the communication state between the first device and the another processing device has a priority higher than the communication state between the first device and the processing device.

6. The processing device according to claim 5,
wherein the at least one processor is configured to execute the instructions to:
transmit the diagnostic communication packets to all communication destinations that communicate when the process of the processing device is used in the first device.

7. The processing device according to claim 5,
wherein the at least one processor is configured to execute the instructions to:
receive diagnostic communication packets transmitted from the another processing device; and
generate a live list based on the received diagnostic communication packets,
transmit the generated live list as a part of the diagnostic communication packets of the processing device at predetermined time intervals.

8. A network device connected to a network of a process control system in a plant and configured to transmit diagnostic communication packets to a processing device according to claim 1, the network device comprising:
at least one memory storing instructions, and
at least one processor configured to execute the instructions to:
receive diagnostic communication packets transmitted from the processing device at predetermined time intervals;
generate a live list based on the received diagnostic communication packets, the live list comprising information on operation state of devices of transmission sources of the diagnostic communication packets; and
transmit the generated live list as a part of diagnostic communication packets of the network device at predetermined time intervals.

9. A control method of a processing device, comprising:
providing a process to a first device connected to a network of a process control system in a plant;
acquiring a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair; and
switching a provision state of the process from a standby state in which the processing device is on standby to provide the process to the first device to an active state in which the processing device provides the process to the first device based on the acquired live list,
wherein the control method comprises:
acquiring a plurality of live lists from a plurality of devices connected to the network; and switching the provision state of the process from the standby state to the active state when all the plurality of live lists acquired within a predetermined period include the information indicating that the communication between the first device and the another processing device is not normally operated, wherein the control method comprises:

providing a process to a second device connected to the network;

receiving:

a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;

acquiring the first live list from the first diagnostic communication packet and the second live list from the second diagnostic communication packet; and switching the provision state of the process from the standby state to the active state when both of the first and second live lists acquired within a predetermined period include information indicating that the communication with the another processing device is not normally operated.

10. A control method of a processing device, comprising:

providing a process to a first device connected to a network of a process control system in a plant;

transmitting diagnostic communication packets at predetermined time intervals;

acquiring a live list based on diagnostic communication packets generated by the first device and transmitted from the first device at predetermined time intervals, the live list comprising information on operation state of devices of transmission sources of the diagnostic communication packets, and switching a provision state of the process to a standby state in which the processing device is on standby to provide the process to the first device based on the acquired live list, wherein the control method comprises:

acquiring a plurality of live lists from a plurality of devices connected to the network;

analyzing a communication state of a communication path between the processing device and the first device using the live lists acquired within a predetermined period; and switching the provision state of the process to the standby state and stopping the transmitting of the diagnostic communication packets when a communication state between the first device and another processing device that provides a process to the first device has a priority higher than a communication state between the first device and the processing device, the processing device and the another processing device constituting a redundant pair, wherein the control method comprises:

providing a process to a second device connected to the network;

receiving:

a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;

acquiring the first live list from the first diagnostic communication packet and the second live list from the second diagnostic communication packet;

analyzing the communication state of the communication path between the processing device and the first device using the first and second live lists acquired within the predetermined period; and switching the provision state of the process to the standby state when the communication state between the first device and the another processing device has a priority higher than the communication state between the first device and the processing device.

11. A control method of a network device connected to a network of a process control system in a plant and configured to transmit diagnostic communication packets to a processing device according to claim 1, comprising:

receiving diagnostic communication packets transmitted from the processing device at predetermined time intervals;

generating a live list based on the received diagnostic communication packets, the live list comprising information on operation state of devices of transmission sources of the diagnostic communication packets; and transmitting the generated live list as a part of diagnostic communication packets of the network device at predetermined time intervals.

12. A non-transitory computer-readable storage medium storing a control program of a processing device, which when executed by a computer, causes the computer to execute:

providing a process to a first device connected to a network of a process control system in a plant;

acquiring a live list generated by the first device based on diagnostic communication packets transmitted from the first device at predetermined time intervals, the live list comprising information indicating whether communication between the first device and another processing device that provides a process to the first device is normal, the processing device and the another processing device constituting a redundant pair; and switching a provision state of the process from a standby state in which the processing device is on standby to provide the process to the first device to an active state in which the processing device provides the process to the first device based on the acquired live list, wherein the control program of the processing device, which when executed by the computer, causes the computer to execute:

acquiring a plurality of live lists from a plurality of devices connected to the network; and switching the provision state of the process from the standby state to the active state when all the plurality of live lists acquired within a predetermined period include the information indicating that the communication between the first device and the another processing device is not normally operated, wherein the control program of the processing device, which when executed by the computer, causes the computer to execute:

providing a process to a second device connected to the network;

receiving:
a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;

acquiring the first live list from the first diagnostic communication packet and the second live list from the second diagnostic communication packet; and switching the provision state of the process from the standby state to the active state when both of the first and second live lists acquired within a predetermined period include information indicating that the communication with the another processing device is not normally operated.

13. A non-transitory computer-readable storage medium storing a control program of a processing device, which when executed by a computer, causes the computer to execute:

providing a process to a first device connected to a network of a process control system in a plant;

transmitting diagnostic communication packets at predetermined time intervals;

acquiring a live list based on diagnostic communication packets generated by the first device and transmitted from the first device at predetermined time intervals, the live list comprising information on operation state of devices of transmission sources of the diagnostic communication packets; and switching a provision state of the process to a standby state in which the processing device is on standby to provide the process to the first device based on the acquired live list, wherein the control program of the processing device, which when executed by the computer, causes the computer to execute:

acquiring a plurality of live lists from a plurality of devices connected to the network;

analyzing a communication state of a communication path between the processing device and the first device using the live lists acquired within a predetermined period; and switching the provision state of the process to the standby state and stopping the transmitting of the diagnostic communication packets when a communication state between the first device and another processing device that provides a process to the first device has a priority higher than a communication state between the first device and the processing device, the processing device and the another processing device constituting a redundant pair, wherein the control program of the processing device, which when executed by a computer, causes the computer to execute:

providing a process to a second device connected to the network;

receiving:
a first diagnostic communication packet generated by and transmitted from the first device, the first diagnostic communication packet including a first live list including information indicating whether communication between the first device and the another processing device is normally operated, information indicating whether communication between the first device and the processing device is normally operated, and information indicating whether communication between the first device and the second device is normally operated; and a second diagnostic communication packet generated by and transmitted from the second device, the second diagnostic communication packet including a second live list including information indicating whether communication between the second device and the another processing device is normally operated, information indicating whether communication between the second device and the processing device is normally operated, and information indicating whether communication between the second device and the first device is normally operated;

acquiring the first live list from the first diagnostic communication packet and the second live list from the second diagnostic communication packet;

analyzing the communication state of the communication path between the processing device and the first device using the first and second live lists acquired within the predetermined period; and switching the provision state of the process to the standby state when the communication state between the first device and the another processing device has a priority higher than the communication state between the first device and the processing device.

14. A non-transitory computer-readable storage medium storing a control program of a network device which is connected to a network of a process control system in a plant and configured to transmit diagnostic communication packets to a processing device according to claim 1, which when executed by a computer, causes the computer to execute:

receiving diagnostic communication packets transmitted from the processing device at predetermined time intervals;

generating a live list based on the received diagnostic communication packets, the live list comprising information on operation state of devices of transmission sources of the diagnostic communication packets; and transmitting the generated live list as a part of diagnostic communication packets of the network device at predetermined time intervals.

* * * * *